United States Patent [19]

Inoue et al.

[11] Patent Number: 4,735,178
[45] Date of Patent: Apr. 5, 1988

[54] TURBO-SUPERCHARGER FOR INTERNAL COMBUSTION ENGINE

[75] Inventors: Kazuo Inoue, Tokyo; Masatoshi Suzuki, Urawa, both of Japan; Ryo Narisawa, Shakespear, Canada; Isao Terabe, Fujimi; Osamu Kubota, Asaka, both of Japan

[73] Assignee: Honda Giken Kogyo Kabushiki Kaisha, Tokyo, Japan

[21] Appl. No.: 858,871

[22] Filed: May 1, 1986

Related U.S. Application Data

[60] Division of Ser. No. 802,072, Nov. 26, 1985, abandoned, which is a continuation of Ser. No. 299,584, Sep. 4, 1981, abandoned.

[30] Foreign Application Priority Data

Sep. 5, 1980 [JP] Japan .................. 55-123302

[51] Int. Cl.⁴ .............. B60K 13/06; F02D 23/00
[52] U.S. Cl. ..................... 123/219; 60/605; 123/52 M
[58] Field of Search ............ 180/219, 218, 68.1, 180/68.2; 60/605, 602, 597, 598; 123/52 M, 52 MB

[56] References Cited

U.S. PATENT DOCUMENTS

| | | | |
|---|---|---|---|
| 3,796,048 | 3/1974 | Annus et al. ............... | 60/605 R |
| 4,005,579 | 2/1977 | Lloyd ..................... | 60/602 |
| 4,173,203 | 11/1979 | Nakasima et al. ............ | 123/432 X |
| 4,353,211 | 10/1982 | Cser et al. ................ | 123/52 M X |
| 4,356,798 | 11/1982 | Sakaoka et al. ............. | 123/52 X |
| 4,368,698 | 1/1983 | Matsuo et al. .............. | 123/52 M |
| 4,444,013 | 4/1984 | Inoue et al. ............... | 60/60 JR |
| 4,445,336 | 5/1984 | Inoue ..................... | 60/605 R |
| 4,482,024 | 11/1984 | Matsuda et al. ............. | 60/605 R X |

FOREIGN PATENT DOCUMENTS

| | | | |
|---|---|---|---|
| 197809 | 9/1978 | France ................... | 123/52 M |
| 64337 | 5/1979 | Japan .................... | 180/219 |
| 118907 | 9/1979 | Japan .................... | 180/219 |
| 33020 | 2/1982 | Japan .................... | 180/219 |
| 38617 | 3/1982 | Japan .................... | 123/52 M |
| 157917 | 8/1985 | Japan .................... | 180/219 |
| 162083 | 4/1921 | United Kingdom .......... | 123/52 M |

OTHER PUBLICATIONS

Ray Hill, Turbo Cycle Uses Computer-Controlled Fuel Injection, Nov. 1981, pp. 60 & 65-Popular Science.

Primary Examiner—John J. Love
Assistant Examiner—Mitchell J. Hill
Attorney, Agent, or Firm—Armstrong, Nikaido, Marmelstein & Kubovcik

[57] ABSTRACT

A turbo-supercharger is provided for internal combustion engines which comprises a turbine disposed at an intermediate portion of an exhaust passage for the engine, and which is driven by a gas flowing therein. A compressor is disposed at an intermediate portion of a suction passage for the engine and is driven by said turbine. Also, a pre-chamber is disposed at that portion of the suction passage which is on the downstream side of the compressor, and is characterized by a resonance chamber which is communicated with the suction passage via a branch passage. The branch passage can be connected to the suction passage between the pre-chamber and the compressor, between the throttle valve and a fuel injection nozzle, on the upstream side of the compressor or directly at the pre-chamber.

5 Claims, 12 Drawing Sheets

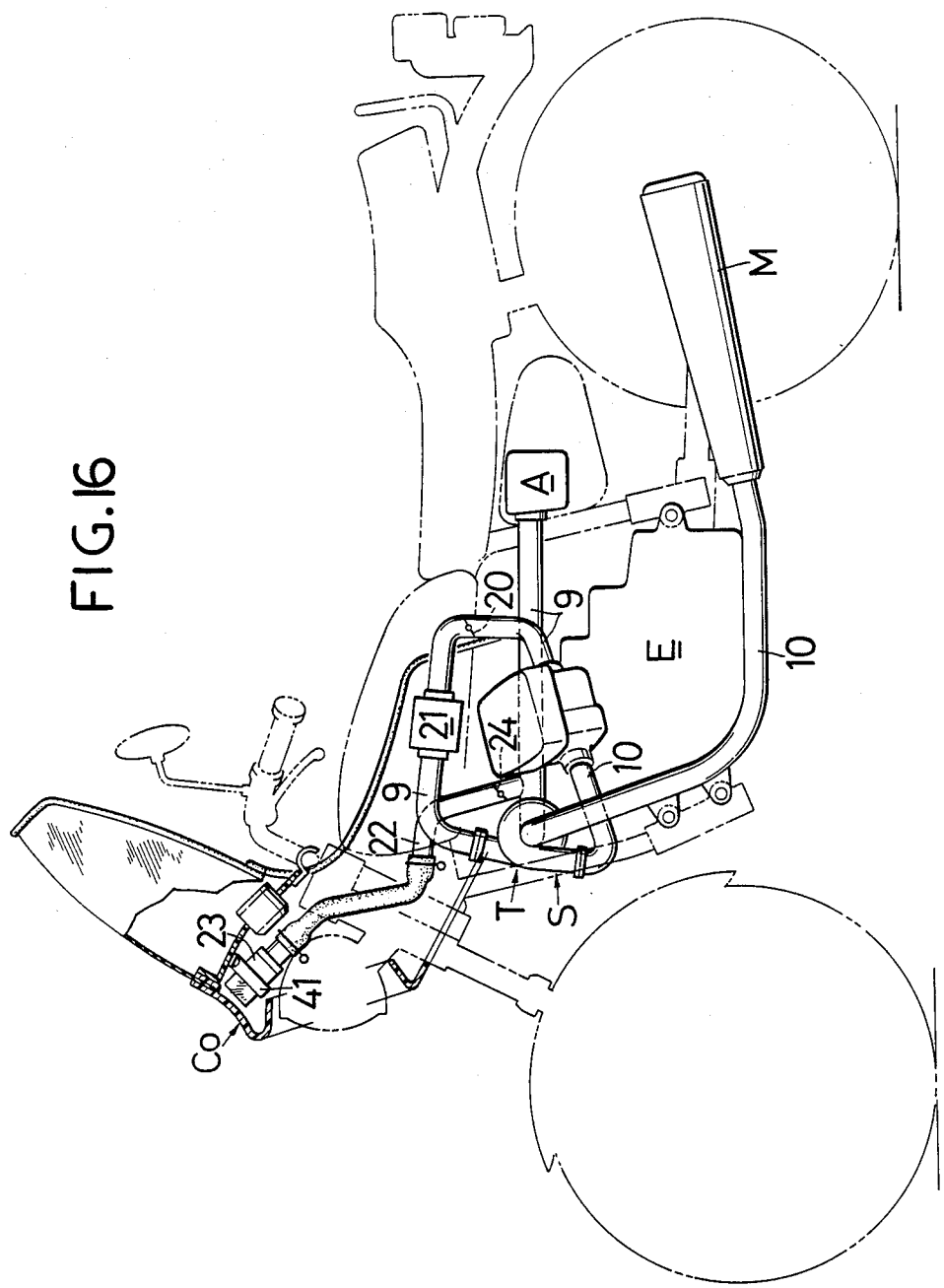

TURBO-SUPERCHARGER FOR INTERNAL COMBUSTION ENGINE

This application is a division of application Ser. No. 802,072, filed Nov. 26, 1985, now abandoned, which is a continuation of Ser. No. 299,584, filed Sept. 4, 1981, abandoned.

BACKGROUND OF THE INVENTION

1. Field of the Invention

This invention relates to a reciprocating internal combustion engine and, more particularly, to a turbo-supercharger for pressuring the suction air for the engine to thereby increase the charging efficiency and improve engine output.

2. Description of the Prior Art

There is a known turbo-supercharger for reciprocating internal combustion engines in which a turbine is rotated by the exhaust energy from the engine to actuate a compressor, which then causes the suction air to be pressurized so as to increase the charging efficiency and thereby improve engine output. In such an internal combustion engine, a pulsation of pressure occurs in a suction passage due to the intermittent opening and closing operations of a suction valve. The pulsation of pressure affects the outlet of the compressor to cause a so-called "surging phenomenon", which results in a decrease in the flow rate of suction air and, thus, engine output. It is known that, in order to eliminate the above-mentioned inconveniences, a prechamber having a predetermined capacity is provided in that portion of the suction passage which is between the compressor and a throttle valve, the pulsation of pressure occuring in the suction passage being thereby damped. However, it is difficult for the turbo-supercharger, to which only such a pre-chamber is added, to attain an improvement in engine output with respect to all operational regions of the engine without adversely affecting the controlling of an operation of the engine and the performance thereof and without causing a surging phenomenon in the compressor.

SUMMARY OF THE INVENTION

An object of the present invention is to provide a turbo-supercharger for internal combustion engines which permits eliminating the above-mentioned inconveniences encountered in the conventional turbo-supercharger and which includes, in addition to a pre-chamber, a resonance chamber communicated with a suction passage via a branch passage thereof so as to attenuate the pulsation of pressure in the suction passage by the resonance effect of the resonance chamber and to prevent a surging phenomenon from occurring in the compressor, thereby obtaining a desired charging efficiency reliably and attaining an improvement in an engine and the performance thereof.

To this end, the present invention provides a turbosupercharger for internal combustion engines comprising a turbine disposed at an intermediate portion of an exhaust passage for the engine and driven by a gas flowing therein, a compressor disposed at an intermediate portion of a suction passage for the engine and actuated by the turbine, and a pre-chamber disposed at that portion of the suction passage which is on the downstream side of the compressor, characterized in that the turbo-supercharger includes a resonance chamber communicated with the suction passage via a branch passage thereof.

The above and other objects as well as advantageous features of the invention will become apparent from the following description of the preferred embodiments, taken in conjunction with the accompanying drawings.

BRIEF DESCRIPTION OF THE DRAWINGS

FIGS. 2–9 illustrate embodiments of turbo-superchargers of the present invention applied to motorcycles wherein:

FIG. 2 is a partially cut-away view in side elevation of a motorcycle on which a turbo-supercharger of the first embodiment is mounted;

FIG. 3 is a perspective view of a frame of the motorcycle as shown in FIG. 2;

FIG. 4 is a partially cutaway view in side elevation of a motorcycle to which a second embodiment is applied;

FIG. 5 is a partially cutaway view in side elevation of a motorcycle to which a third embodiment is applied;

FIG. 6 is a partially cutaway view in side elevation of a motorcycle to which a fourth embodiment is applied;

FIG. 7 is a plan view of a principal portion of the embodiment shown in FIG. 6;

FIG. 8 is a perspective view of a part of a motorcycle to which a fifth embodiment is applied; and FIG. 9 is a sectional view taken along the line IX—IX in FIG. 8.

DESCRIPTION OF THE PREFERRED EMBODIMENTS

In a plurality of embodiments which will be described later, equivalent parts are designated by the same numerals or letters.

Figure 1:
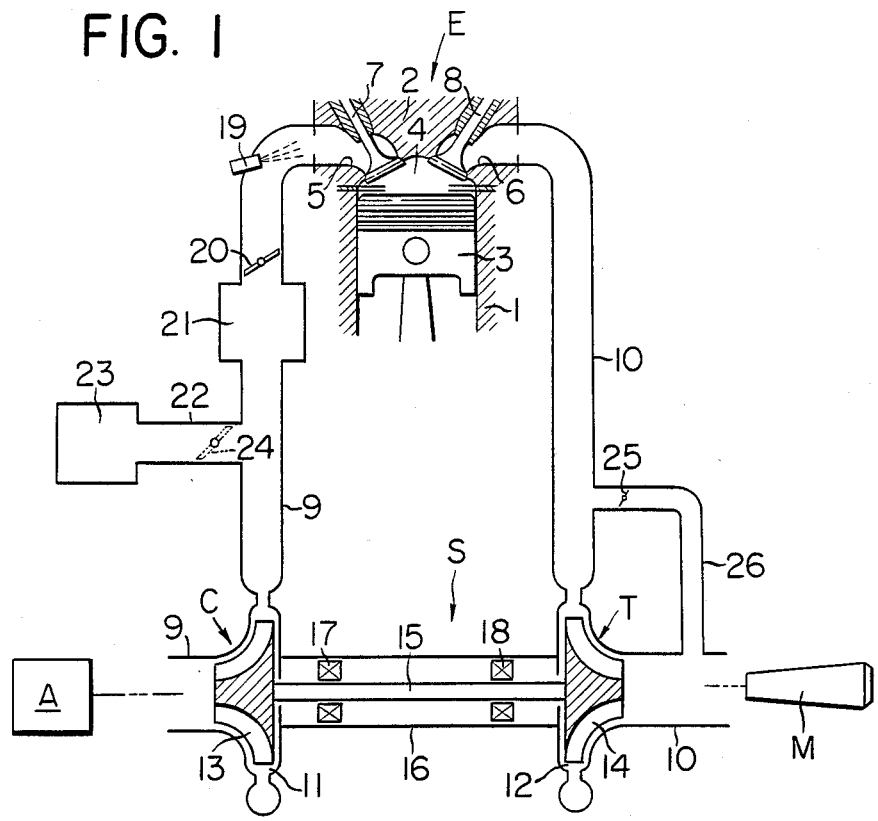
FIG. 1 is a schematic diagram of a first embodiment of a turbo-supercharger according to the present invention.

FIG. 1 illustrates a first embodiment of a turbosupercharger according to the present invention. Referring to FIG. 1, an internal combustion engine E has, just as a conventional ordinary internal combustion engine, a cylinder block 1 in which a piston 3 is slidingly fitted and a cylinder head 2 fixedly set on the cylinder block 1. The cylinder head 2 and piston 3 define a combustion chamber 4 into which a suction port 5 and an exhaust port 6 are opened. These ports 5,6 are opened and closed alternately by a suction valve 7 and an exhaust valve 8.

A suction pipe or passage 9 and an exhaust pipe passage 10 are connected to an outer end of the suction port 5 and an outer end of the exhaust port 6, respsectively, and a turbo-supercharger S is provided between these passages 9,10.

The construction of the turbo-supercharger S will be described. The turbo-supercharger S has a turbine T provided at an intermediate portion of the exhaust passage 10 and a compressor C provided at an intermediate portion of the suction passage 10. The turbine T consists of a turbine wheel 14 housed in a turbine chamber 12 formed at an intermediate portion of the exhaust passage 10. The compressor C consists of a compressor wheel 13 housed in a compressor chamber 11 formed at an intermediate portion of the suction passage 9. The turbine chamber 12 and compressor chamber 11 are connected together by means of a bearing holder 16. The turbine wheel 14 and compressor wheel 13 are joined to each other with a rotary shaft 15, which is supported in the bearing holder 16 via bearings 17,18 in such a manner that the turbine wheel 14 and compressor wheel 13 can be rotated together.

A fuel ejection nozzle 19 is provided in that portion of the suction passage 9 which is close to the suction port 5. A throttle valve 20 is provided close to and on the upstream side of the fuel ejection nozzle 19 and a pre-chamber 21 on the upstream side of the throttle valve 20, the pre-chamber 21 being formed by increasing the cross-sectional area of a part of the suction passage 9. A branch passage 22 is extended from that portion of the suction passage 9 which is between the pre-chamber 21 and compressor C so as to be communicated with a resonance chamber 23.

On the other hand, a waste gate 26 bypassing the turbine T is connected to the exhaust passage 10. An inlet pressure of the turbine T can be regulated by passing a part of an exhaust gas flowing from the engine through the waste gate 26. A waste gate valve 25 for opening and closing the waste gate 26 is provided therein.

Referring to the drawing, an air cleaner A is provided at an inlet of the suction passage 9 and a muffler M is connected to an outlet of the exhaust passage 10.

The operation of the first embodiment of the present invention shown in FIG. 1 will be described. While an internal combustion engine is operated, an exhaust gas discharged from the combustion chamber 4 into the exhaust passage 10 during the exhaust strokes flows for the most part through the turbine T while applying the exhaust energy to the turbine wheel 14. Consequently, the turbine wheel 14 is rotated to drive the compressor wheel 13. As a result, the air sucked from the air cleaner A into the suction passage 9 is pressurized by the compressor C to be sent to the pre-chamber 21. The pressurized air, the flow rate of which has been regulated by the throttle valve 20 is then mixed with a fuel ejected from the nozzle 19. The resulting gaseous mixture is fed into the combustion chamber 4 during suction strokes of the engine. Thus, a high charging efficiency of the gaseous mixture can be attained in the combustion chamber 4. Owing to the combustion of such a gaseous mixture, a high engine output can be obtained.

When the pulsation of pressure occurs in the suction passage 9 due to intermittent actions of the suction valve 7 during operation of the engine, it is attenuated to as great an extent as possible by the synergistic effect of damping and resonating operations in the pre-chamber 21 and resonance chamber 23. This serves to prevent a surging phenomenon from occurring in the compressor C. Accordingly, a desired charging efficiency can be obtained reliably with respect to all operational regions of the engine to allow an engine output to be increased to a great extent.

It has been ascertained that, when the engine is in a certain region of rotation, for example: (1) when the engine is in a region of a high speed-rotation with the throttle valve 20 fully opened, or (2) when the waste gate valve 25 is opened to reduce an excessively high rotational speed of the turbine T, i.e., an excessively high rotational spped of the compressor C, or (3) when the number of revolutions per minute of the engine is slightly lower than the number of revolutions thereof at which a resonance frequency of the resonance chamber 23 is generated, a surging phenomenon referred to previously does not occur, but the engine output tends to decrease due to the operation of the resonance chamber 23. In order to eliminate this inconvenience, it is desirable that a resonance valve 24 be provided in the branch passage 22. When this valve 24 is closed in any of the above-mentioned cases to stop the operation of the resonance chamber 23, the decreasing tendency mentioned above in an engine output can be prevented. Accordingly, an engine output can be improved with respect to all rotational regions of the engine.

When the resonance valve 24 is adapted to be opened and closed in accordance with the rotation of the engine, the operation of the valve 24 can be controlled automatically and reliably.

Although the embodiment described above is directed to a turbo-supercharger S, it may, of course, be substituted by any type of supercharger.

FIGS. 2–9 illustrate a plurality of modes of application of such a turbo-supercharger as mentioned above to motorcycles. In these drawings, parts which are equivalent to any of the parts of the embodiment shown in FIG. 1 are designated by like numerals and letters.

Figure 3:
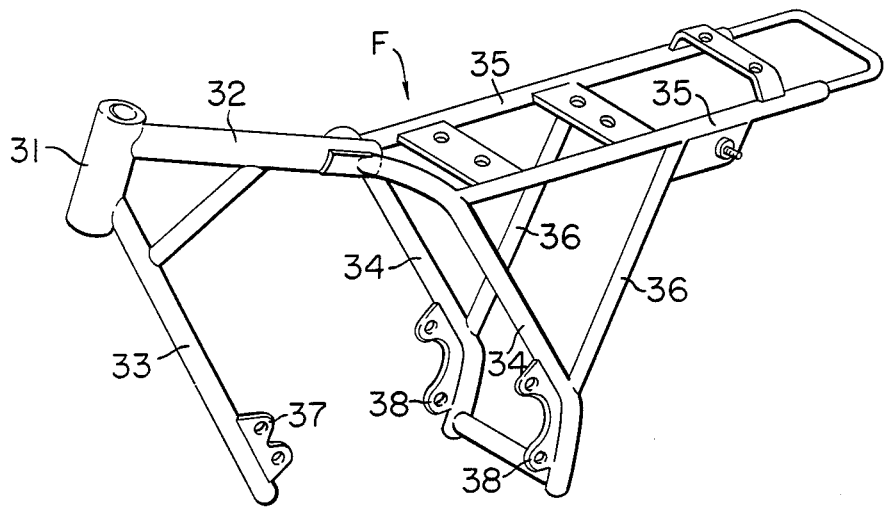
Figure 2:
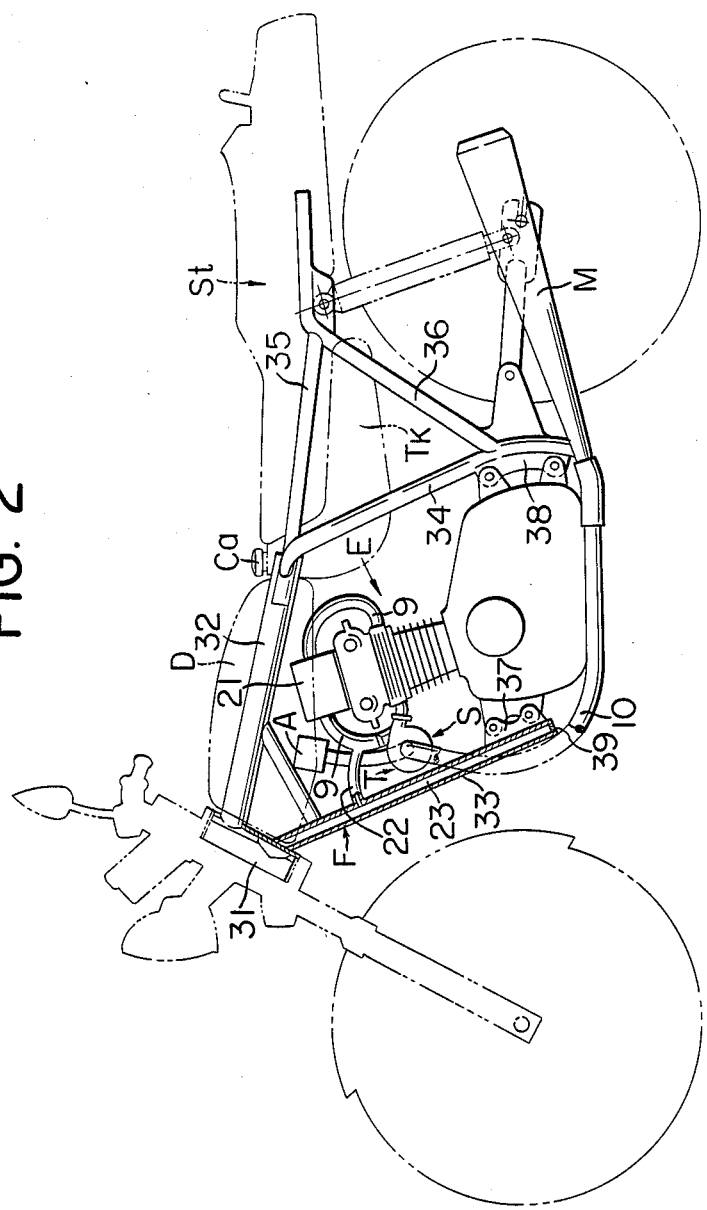

In the embodiment shown in FIGS. 2 and 3, a down tube 33, which constitutes a part of a frame F of a motorcycle, is utilized to form a resonance chamber 23 in the hollow interior thereof. Referring to FIGS. 2 and 3, a reference letter F denotes a frame, made of steel pipes, of a motorcycle. The frame F consists of a main tube 32 welded to an upper end portion of a head pipe 31 and extended backwardly therefrom, a down tube 33 welded to a lower end portion of the head pipe 31 and extended downwardly therefrom, right and left center tubes 34 welded to a rear end portion of the main tube 32 and extended downwardly therefrom, and rear tubes 35 welded to upper end portions of the center tubes 34 and extended backwardly therefrom. Stays 36 are provided between and welded to the center tubes 34 and rear tubes 35. The down tube 33 and center tubes 34 are provided with engine supporting brackets 37,38 fixed thereto. An upper frame portion, i.e., the main tube 32, of the frame F is loaded with a rider's seat St and a dummy tank D, which is disposed immediately before the seat St and which is to be held in a sandwiched manner by the knee of a rider. An engine E is mounted via the brackets 37,38 on a lower frame portion consisting of the down tube 33 and center tubes 34 in such a manner that the engine E is positioned just under the dummy tank D. The dummy tank D houses therein an air cleaner A which will be described later, and some electric machines and tools (not shown). In front of the engine E, a supercharger s for pressurizing the suction air for the engine E is provided. At the back of the engine E, a fuel tank Tk is provided so as to be extended long in the vertical direction as shown in the solid line, or in the horizontal direction as shown in the chain line. An upper portion of the fuel tank Tk is interposed between the dummy tank D and seat St, and a tank cap Ca is set on the upper end thereof. Both of the side surfaces of the fuel tank Tk are surrounded by the frame F. The down tube 33 consists of a steel pipe, the upper and lower ends of which are closed with the head pipe 31 and a cover member 39, respectively. A resonance chamber 23 of a predetermined capacity is formed in the down tube 33 and communicated via a branch passage 22 with the suction passage 9 at that portion thereof which is between a pre-chamber 21 and a compressor C. When a supercharger S is disposed between the engine E and down tube 33, the suction passage 9 and branch passage 22 can be shortened and, moreover, the pre-chamber 21 can be disposed just above the engine E.

In this embodiment, the engine E is mounted on the frame F and the super charger S is disposed before the engine E with the fuel tank Tk provided behind the engine E as mentioned previously. In other words, the engine E is sandwiched between the supercharger S and fuel tank Tk, so that the fuel tank Tk is not influenced by the heat radiated by the supercharger which is heated to a high temperature. This allows the rate of evaporation of the fuel in the tank Tk to be reduced to a great extent.

The fuel tank Tk is disposed in a dead space behing the engine E and does not necessarily require, as mentioned previously, to be positioned in an upper portion of the frame F. Accordinglyl, the fuel tank Tk and other parts can be arranged and set easily to allow the appearance of the motorcycle to be improved.

Since the fuel tank Tk of a large weight can be disposed in a lower portion of the frame F, the center of gravity of a motorcycle body is lowered so that the motorcycle can be moved in an improved condition. In addition, the fuel tank Tk, which is disposed behind the engine E and surrounded by the frame F can be kept from interference with obstacles.

Figure 4:
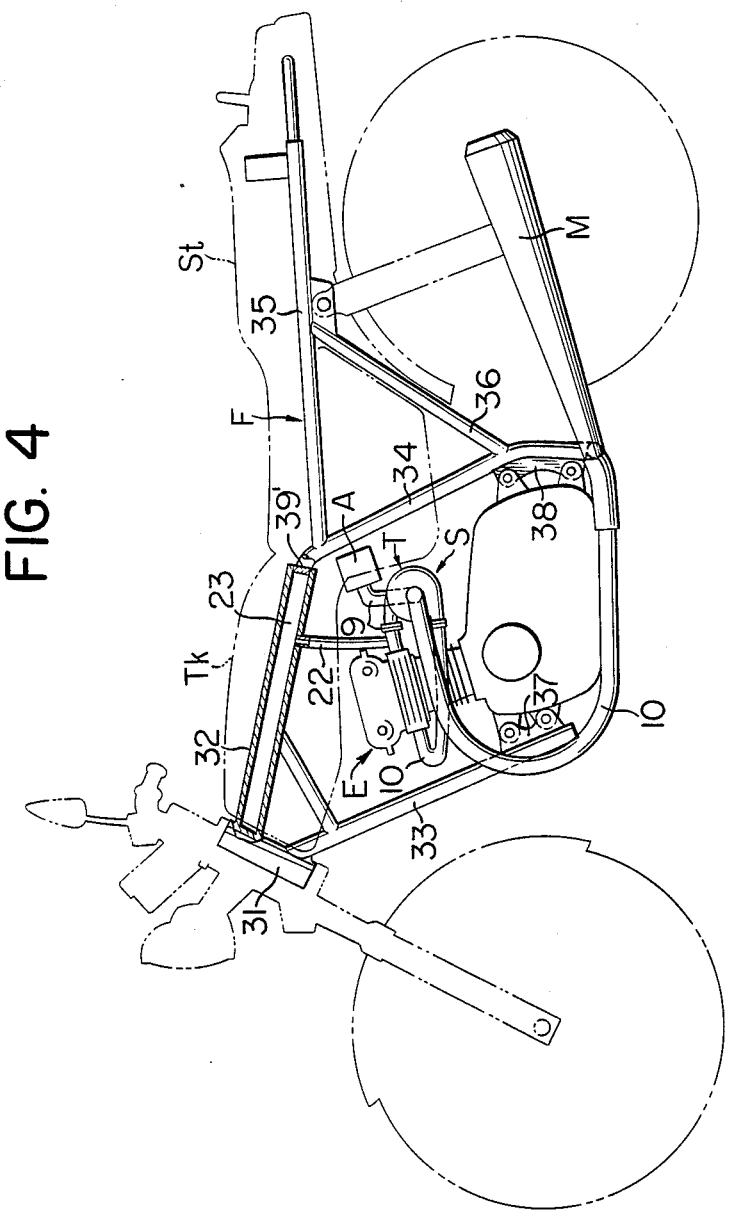

FIG. 4 illustrates a modification of the embodiment shown in FIG. 2. The modification is substantially identical in construction with the embodiment shown in FIG. 2 except that a pre-chamber 21 is omitted. A resonance chamber 23 is formed, not in a down tube 33 but in the hollow interior of a main tube 32 disposed at an upper portion of the frame F and closed at both ends thereof with a head pipe 31 and a cover member 39'. Supercharger S and an air cleaner A are provided behind an engine E, and a dummy tank is omitted and replaced with a fuel tank Tk.

Figure 5:
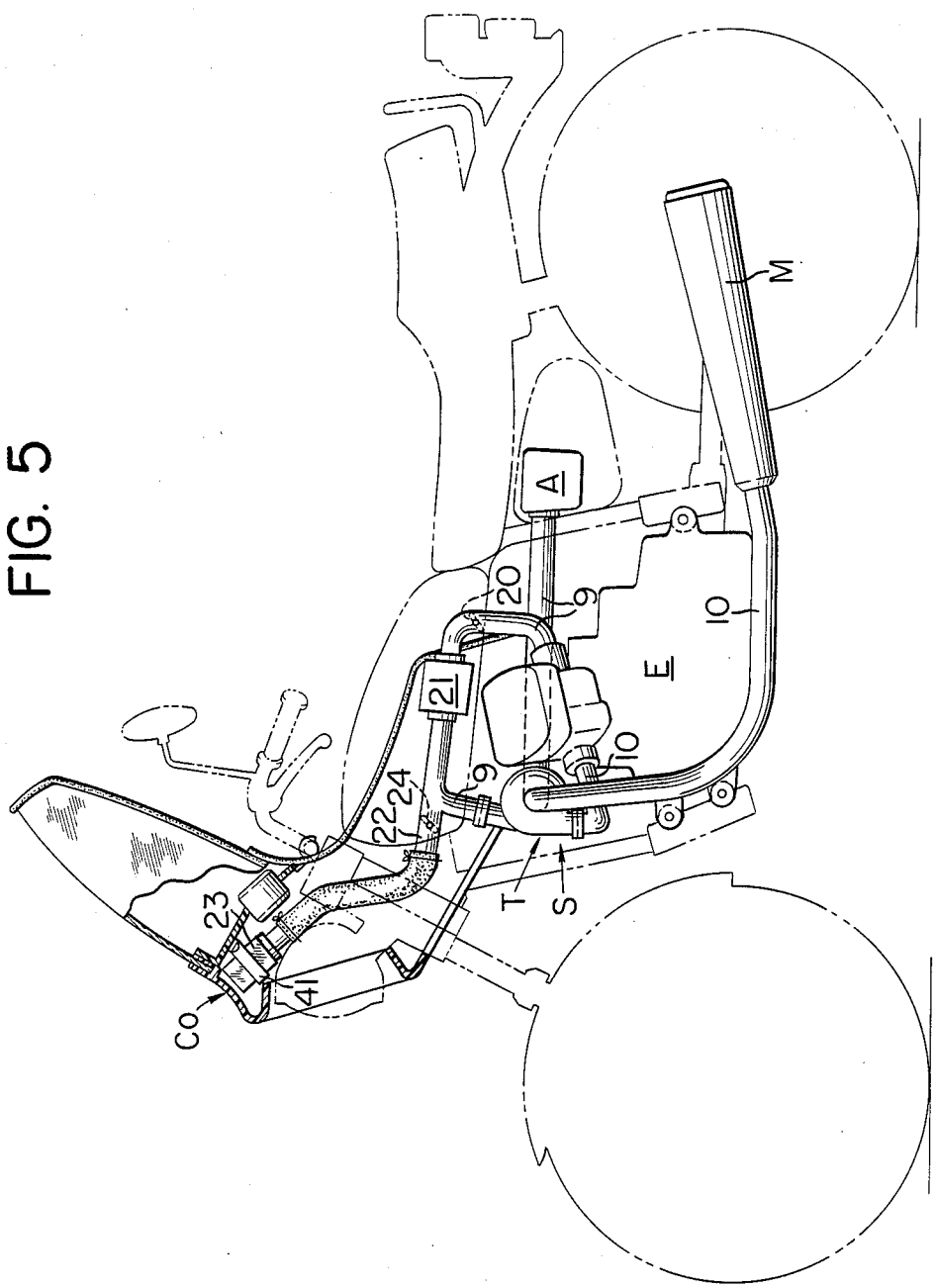

FIG. 5 shows another embodiment in which a resonance chamber 23 is placed and set in a dead space formed in a cowling Co of a motorcycle.

The cowling Co, which is adapted to protect a rider in the embodiment in FIG. 5, is set on a frame so as to cover a front portion thereof. The resonance chamber 23 is supported via a stay 41 on the inner surface of the cowling Co.

Figure 6:
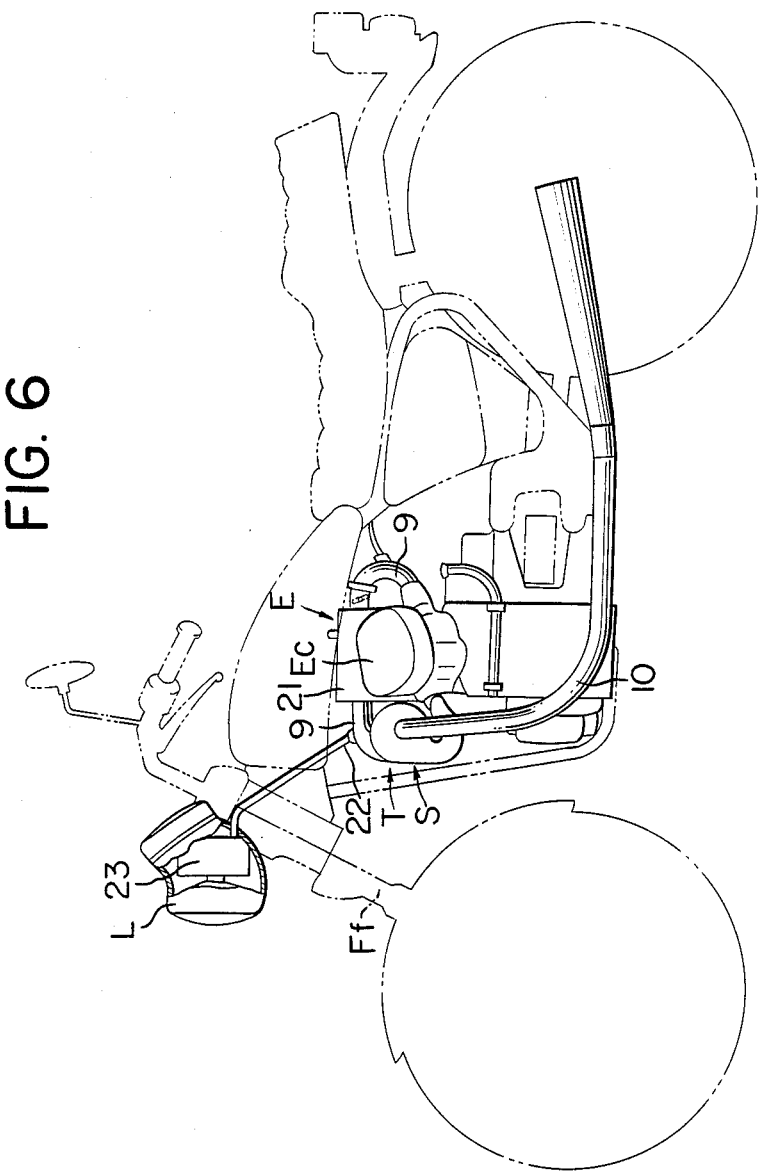
Figure 7:
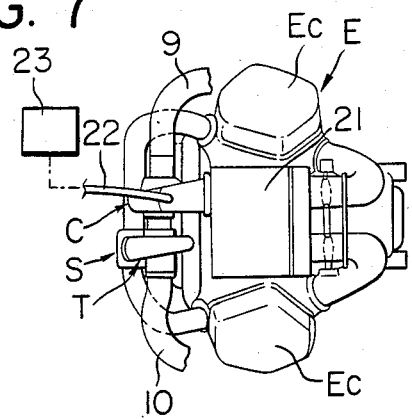

FIGS. 6 and 7 show still another embodiment in which a resonance chamber 23 is provided in a headlight case L of a motorcycle. The resonance chamber 23, which is provided in the headlight case L secured to a front upper portion of a front fork $F_f$ is communicated via a branch passage 22 consisting of a flexible pipe with a suction passage 9 at that portion thereof which is between a pre-chamber 21 and a compressor C. The resonance chamber 23 in this embodiment may be formed in a rear portion of the interior of the headlight case L independently thereof, as shown in FIG. 6. The resonance chamber 23 may also be formed with the headlight case L itself by setting the same air-tight.

As is shown in FIG. 7, the pre-chamber 21 is disposed between V-shaped cylinder portions Ec of the N-type engine.

Figure 8:
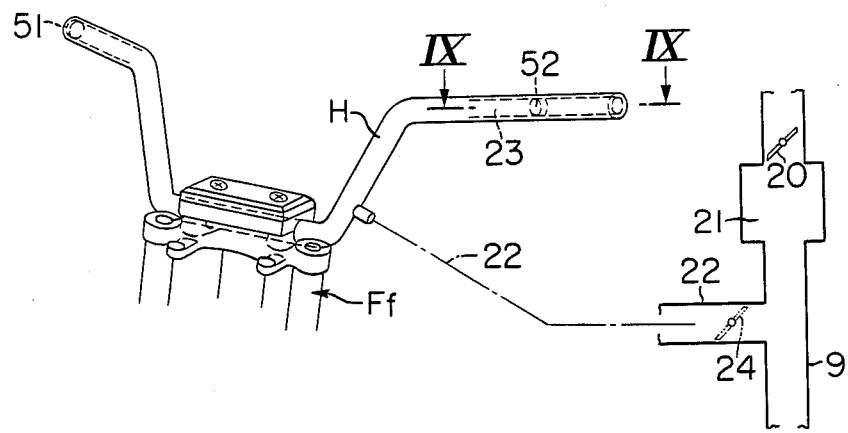
Figure 9:
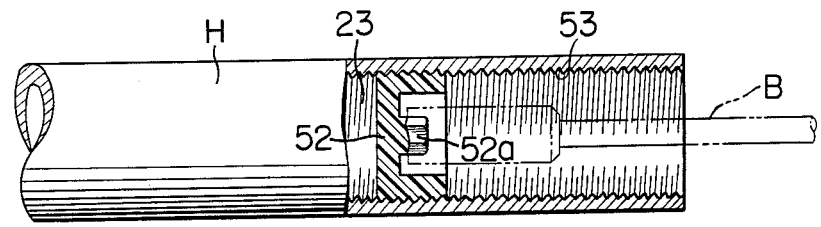

FIGS. 8 and 9 show a further embodiment, in which a resonance chamber 23 is formed in a steering handle H of a motorcycle soi as not to change and spoil the appearance of the motorcycle.

In the embodiment shown in FIGS. 8 and 9, the steering handle H, which is formed by bending a steel pipe, is closed with a fixed plug 51 at one end thereof and with a movable 52 at the other end thereof. The space defined by the inner surfaces of the plugs 51,52 is utilized as a resonance chamber 23. The movable plug 52 is brought into engagement with a female screw 53 formed in the inner circumferential surface of the steering handle H and is adapted to be moved inwardly and outwardly in the axial direction in the handle H when a tool B is turned to permit a screwing motion of the plug 52 with respect to the female screw 53. The capacity of the resonance chamber 23 can be regulated suitably by moving the plug 52 in the above-mentioned manner. Reference numeral 52a denotes a projection formed on the movable plug 52 and engaged with the tool B. It is desirable that a branch passage 22 for communicating the resonance chamber 23 with a suction passage 9 be made of a flexible pipe so as not to hamper an oscillatory movement of the steering handle H, and that the branch passage 22 be provided in a position as close as possible to a front fork $F_f$, which is turned by the steering handle H.

Figure 10:
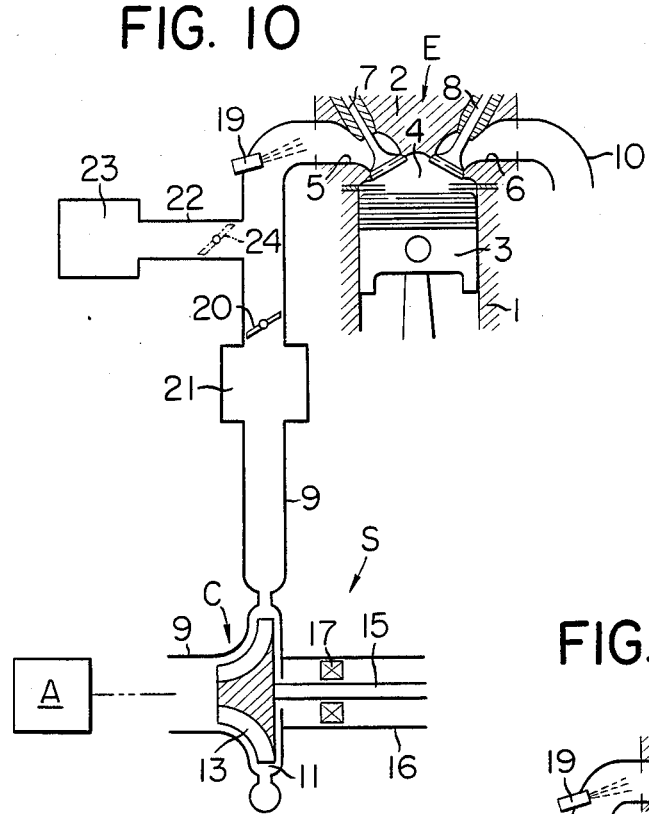
FIGS. 10–12 illustrate modifications of the turbosupercharger shown in FIG. 1.

FIG. 10 illustrates a modification of the emobdiment shown in FIG. 1. In this modification, a branch passage 22 is extended from that portion of a suction pipe or passage 9 which is between a fuel ejection nozzle 19 and a throttle valve 20 and a resonance chamber 23 is joined to the branch passage 9.

Figure 11:
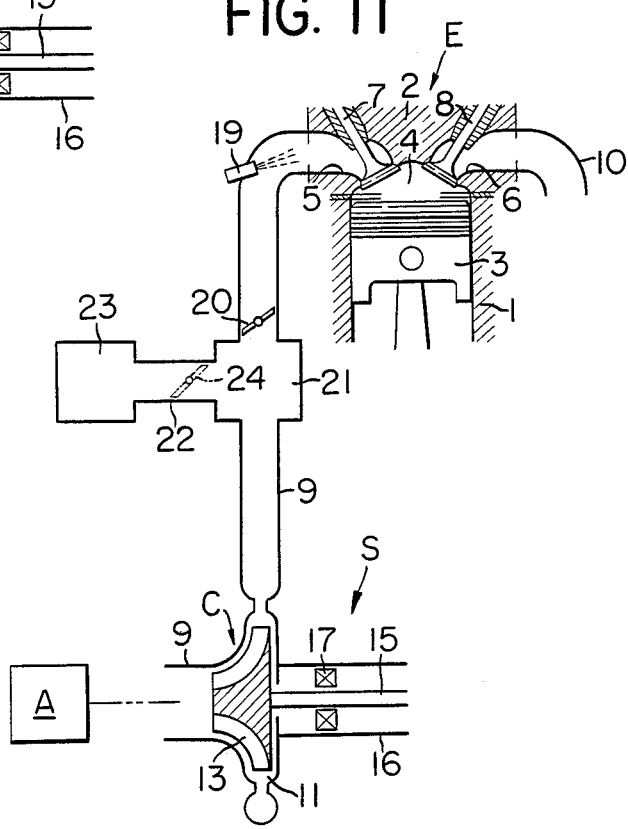

FIG. 11 illustrates another modification of the embodiment shown in FIG. 1. In this modification, a branch passage 22 is extended from a pre-chamber 21, which is formed in that portion of a suction pipe or passage 9 which is between a compressor C and a throttle valve 20, and a resonance chamber 23 is joined to the branch passage 22.

Figure 12:
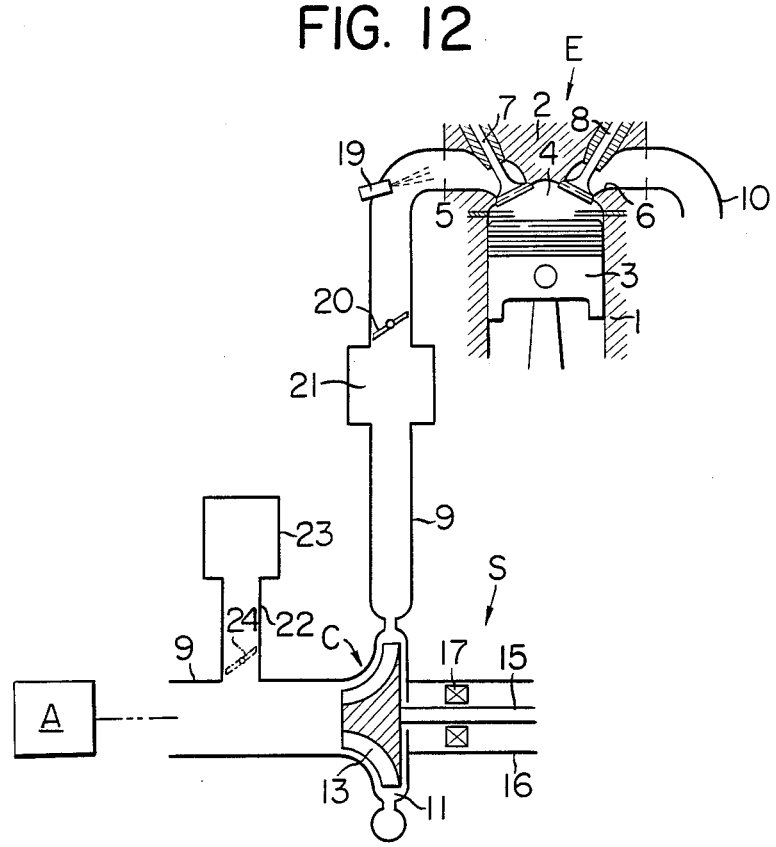

FIG. 12 illustrates still another modification of the embodiment shown in FIG. 1. In this modification, a branch passage 22 is extended from that portion of a suction pipe or passage which is on the upstream side of a compressor C, and a resonance chamber 23 is joined to the branch passage 22.

In all of the modifications shown in FIGS. 10-12, the pre-chamber 21 and resonance chamber 23 cooperate with each other to attenuate the pulsation of pressure in the suction passage 9 in the same manner as in the embodiment shown in FIG. 1, to prevent a surging phenomenon from occuring in the compressor C.

Figure 13:
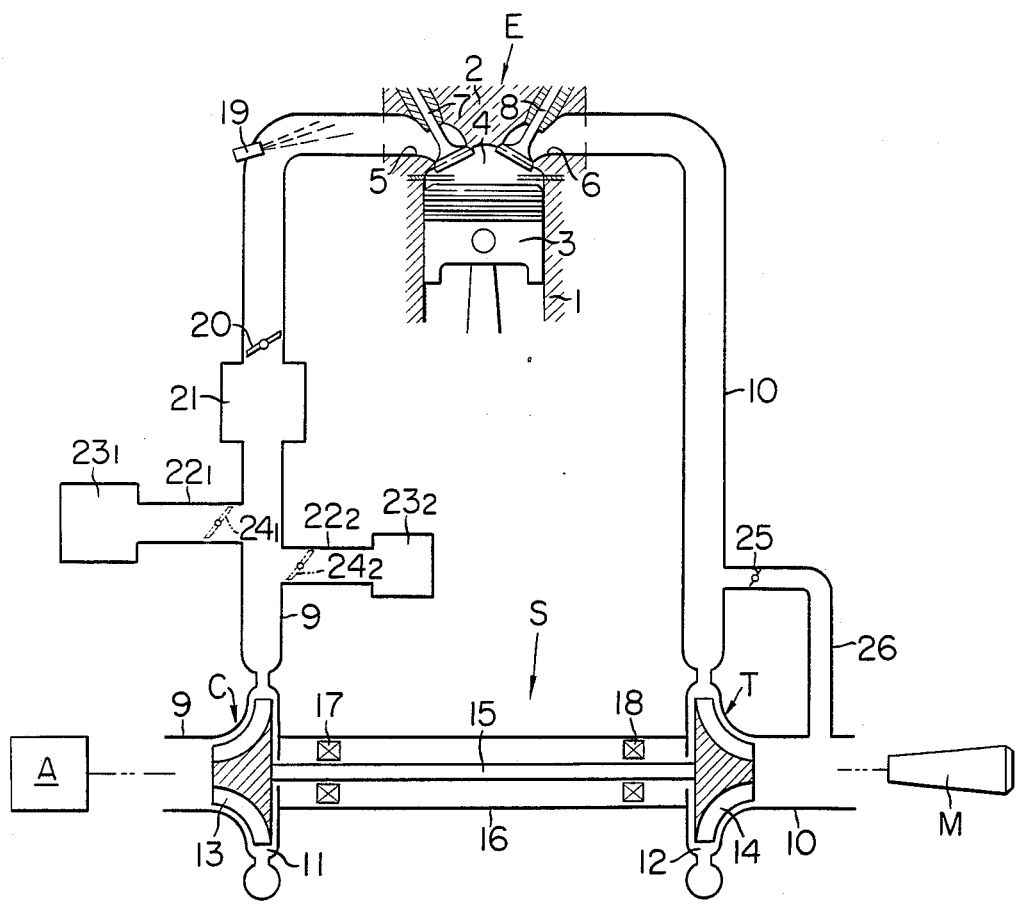
FIG. 13 is a schematic diagram of a further embodiment of the turbo-supercharger according to the present invention.

FIG. 13 illustrates a further embodiment of a turbosupercharger according to the present invention. In this embodiment, first and second branch passages $22_1,22_2$ are extended from two different positions in that portion of a suction passage 9 which is between a pre-chamber 21 and a compressor C, first and second resonance chambers $23_1,23_2$ having different resonance frequencies being joined to these branch passages $22_1,22_2$, respectively. This modification is identical in construction with the embodiment shown in FIG. 1 except for the points referred to above. In this modification, the pulsation of pressure occurring in a suction passage 9 during an operation of the engine is attenuated to as great an extent as possible by the synergistic effect of damping actions in the pre-chamber 21 and resonating actions peculiar to the respective first and second resonance chambers $23_1,23_2$ having different resonance frequencies, so that the occurrence of a surging phenomenon in the compressor C can be effectively prevented.

Figure 14:
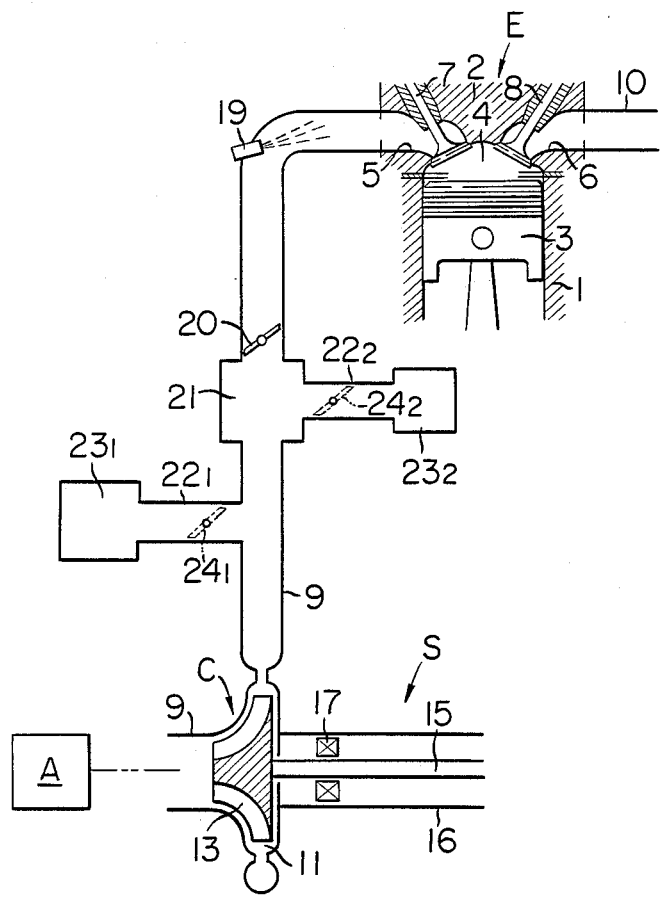
FIGS. 14 and 15 illustrate modifications of the embodiment shown in FIG. 13.

FIG. 14 illustrates a modification of the embodiment shown in FIG. 13. In this modification, a second resonance chamber $23_2$ is joined to a pre-chamber 21 via a second resonance tube $22_2$, and substantially the same effect as in the embodiment shown in FIG. 13 can be obtained. Needless to say, a first resonance chamber $23_1$ in this modification may be connected to the pre-chamber 21 via a first resonance tube $22_1$.

Figure 15:
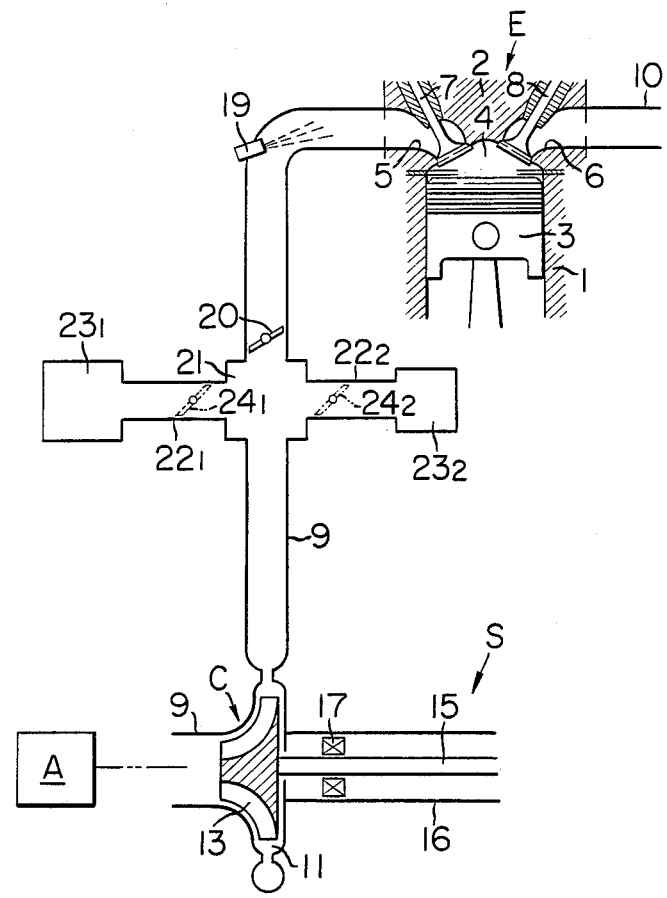

FIG. 15 illustrates another modification of the embodiment shown in FIG. 13. In this modification, both first and second resonance chambers $23_1, 23_2$ are connected to a prechamber 21 via first and second resonance tubes $22_1, 22_2$, and substantially the same effect can be obtained as in the embodiment shown in FIG. 13.

In all of the embodiments and modifications described above of the turbo-superchargers according to the present invention, valves 24, $24_1$, $24_2$ may be provided as shown in chain line in the branch passages 22, via which the resonance chambers 23, $23_1$, $23_2$ are communicated with the suction passages 9 to open or close the valves 24, $24_1$, $24_2$ as necessary and thereby establish or sever the communicating relations between the resonance chambers 23, $23_1$, $23_2$ and the suction passage 9. Also, the branch passages 22 may be utilized as resonance tubes. Not less than three resonance chambers having different resonance frequencies may be communicated with a suction passage 9. Such resonance chambers may be joined to any portions of a suction passage 9 by which an exhaust port 6 in an engine body E and an air cleaner A are communicated with each other. For example, all or some of the resonance chambers may be connected to that portion of the suction passage 9 which is on the upstream side of a compressor C or a pre-chamber 21. The number of the resonance chambers employed in the present invention is not limited.

As may be clearly understood from the above-described embodiments according to the present invention, a compressor for the supercharger is provided in a suction passage, a prechamber is provided in that portion of the suction passage which is on the downstream side of the compressor and a resonance chamber is connected to the suction passage via a branch passage so that the pulsation of pressure in the suction passage can be effectively attenuated by the synertistic effect of damping actions and resonating actions in the pre-chamber and resoance chamber, respectively, preventing a surging phenomenon from occurring in the compressor C, obtaining a desired charging efficiency reliably and improving engine output to a great extent with respet to all operational regions of the engine owing to the excellent effect of the turbo-supercharger without adversely affecting the controlling of an operation of the engine and the performance thereof.

As many apparently widely different embodiments of this invention may be made without departing from the spirit and scope thereof, it is to be understood that the invention is not limited to the specific embodiments thereof except as defined in the appended claims.

What is claimed:

1. A turbo-supercharged motorcycle including:
a frame;
an engine mounted on the frame and having suction pipe defining a suction passage and an exhaust pipe defining an exhaust passage;
a turbo-supercharger connected with said engine and comprising:
a turbine disposed at an intermediate portion of said exhaust passage for the engine and driven by a gas flowing therein, and
a compressor disposed at an intermediate portion of said suction passage for the engine and driven by the turbine;
a pre-chamber disposed at that portion of said suction passage which is on the downstream side of said compressor;
a branch passage connected to said suction passage at that portion thereof which is upstream of said compressor;
a resonance chamber communicated with said suction passage via said branch passage; and
a throttle valve disposed in said suction passage downstream of said pre-chamber;
wherein said resonance chamber is formed by means for preventing surging positioned at a forward portion of said frame.

2. The turbo-supercharged motorcycle according to claim 1, further comprising a headlight case mounted on said forward portion of said frame, and wherein said means for preventing surging is provided in said headlight case.

3. The turbo-supercharged motorcycle according to claim 1, further comprising a hollow steering handle operatively mounted on said forward portion of said frame, and said means for preventing surging comprises a fixed plug at one end of said hollow steering handle and a movable plug mounted at the other end of said hollow steering handle movable engaged with an inner surface of said hollow steering handle for regulating capacity of said resonance chamber.

4. A turbo-supercharged motorcycle including:
a frame;
an engine mounted on the frame and having a suction pipe defining a suction passage and an exhaust pipe defining an exhaust passage;
a turbo-supercharger connected with said engine and comprising:
a turbine disposed at an intermediate portion of said passage for the engine and driven by a gas flowing therein, and
a compressor disposed at an intermediate portion of said suction passage for the engine and driven by the turbine;
a pre-chamber disposed at that portion of said suction passage which is on the downstream side of said compressor;
a branch passage connected to said suction passage at that portion thereof which is upstream of said compressor;
a resonance chamber communicated with said suction passage via said branch passage;
a throttle valve disposed in said suction passage downstream of said pre-chamber; and
a cowling set on said frame so as to cover a front portion thereof, said resonance chamber being formed by means for preventing surging positioned in a dead space of said cowling.

5. The turbo-supercharged motorcycle according to claim 4, wherein said resonance chamber is supported via a stay on an inner surface in the dead space of said cowling.

* * * * *